United States Patent [19]

Morroni

[11] 4,006,879
[45] Feb. 8, 1977

[54] DEGATING

[76] Inventor: Peter J. Morroni, P.O. Box 1102, Marco Island, Fla. 33937

[22] Filed: Apr. 22, 1976

[21] Appl. No.: 679,478

[52] U.S. Cl. ............................ 249/68; 425/444; 264/334

[51] Int. Cl.[2] ...................................... B29F 1/14

[58] Field of Search ............... 249/66, 67, 68, 205; 425/444

[56] References Cited

UNITED STATES PATENTS

| | | | |
|---|---|---|---|
| 2,304,899 | 12/1942 | Dupre | 249/67 X |
| 3,161,918 | 12/1964 | Zearbaugh | 249/68 |
| 3,456,301 | 7/1969 | Mononi | 249/205 X |
| 3,479,698 | 11/1969 | Shaughnessy | 249/68 X |
| 3,687,591 | 8/1972 | Perego | 249/68 X |
| 3,767,352 | 10/1973 | Rees | 425/444 X |
| 3,893,644 | 7/1975 | Dragick | 425/444 X |

*Primary Examiner*—J. Howard Flint, Jr.
*Attorney, Agent, or Firm*—Charles R. Fay

[57] ABSTRACT

Degating molded plastic articles arranged several in a shot in such a way that certain parts of the articles are in contact and form communication between cavities therefor for the running of the plastic to the various cavities, wherein alternate articles are ejected disrupting the same from all of the other articles and then ejecting the remaining articles, all the ejected articles being thereby automatically degated.

8 Claims, 2 Drawing Figures

DEGATING

BACKGROUND OF THE INVENTION

In the molding of small articles such as tableware for instance, a plurality are molded in a single die and commonly have gates running one to the other of said articles, which gates must be later cut off, i.e., degated, and this is a relatively time consuming and expensive proposition. In the present invention, it is the object to do away with the usual degating step completely.

SUMMARY OF THE INVENTION

In the present invention a die is made of the usual two main parts, each of which is provided with partial cavities mating together to form a cavity for each article molded. In the present case the articles are arranged on an arc so that they extend generally radially outwardly away from a central location in the die and the cavities for each article are in communication with adjacent cavities so that normally when the shot is ejected the articles would be connected together in the form of a fan, and would have to be degated.

However the present invention contemplates using the ejection pins, eg., two for each article, in a two level arrangement so that alternate articles are ejected first and the remaining articles are ejected thereafter. In the initial ejecting step the place where the articles contact each other as explained above are disrupted in the act of ejection, so that all the articles are now free of each other and are deposited in completely degated condition so that the usual subsequent degating step is completely avoided.

PREFERRED EMBODIMENT OF THE INVENTION

Figure 1:
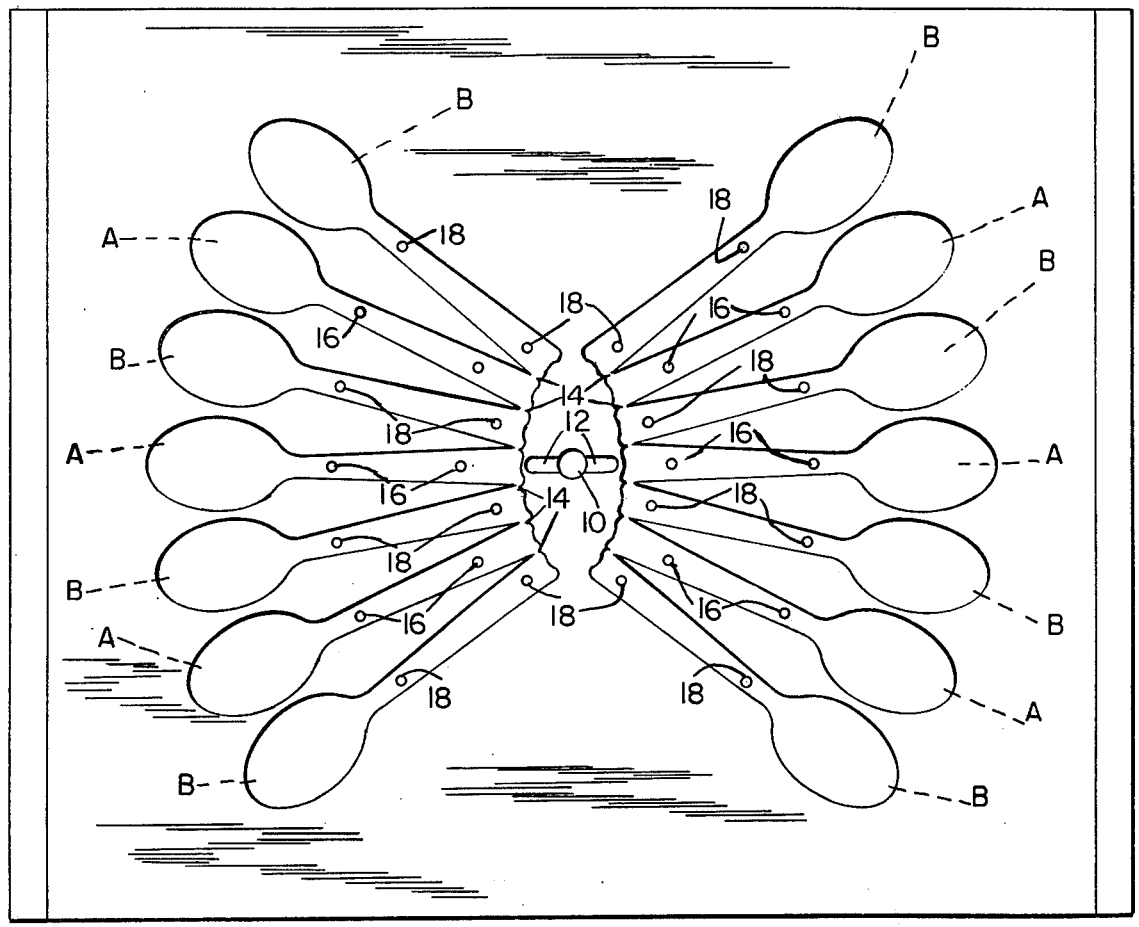
FIG. 1 is a plan view illustrating a part of a die.

Referring to FIG. 1 there is shown a die part which has been made to mold plastic spoons. The cavities however are not arranged in a circle nor are they arranged in general parallelism, but they are arranged in the form of fans radiating outwardly from a central sprue location. Each cavity is adapted to be filled with plastic as usual from the sprue which is of known construction and indicated at 10 and the plastic is led by known means as at 12, 12 into the cavities, or at least into adjacent cavities, from whence the molten plastic material finds its way into the other cavities by reason of the fact that the adjacent areas at contact as at 14, thus providing the equivalent of a runner or the like, the material of which however is formed in and of the articles themselves and not in the nature of a prior art runner that is extraneous relative to the molded articles and must be degated.

It will be seen that once these spoons have been molded and the mold opened and the shot ejected, a fan of spoons would be ejected and fall into a container, and that thereafter each fan would have to be degated at the points 14. In the present disclosure two of these fans of articles are produced at one time.

Ejection pins are shown in FIG. 1 as at 16 and 18.

Figure 2:
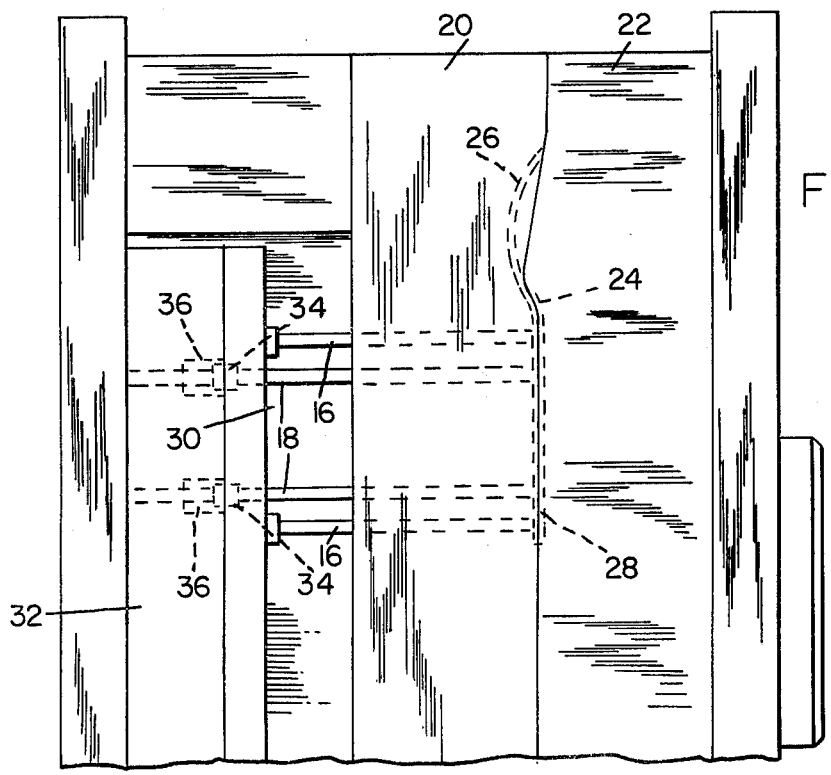
FIG. 2 is a view in elevation looking in the direction of arrow 2 in FIG. 1.

Referring now to FIG. 2 it will be seen that there are two main die parts 20 and 22 which when closed form cavities to produce the spoons 24 having bowls 26 and the handle end portions 28 which will be connected at 14 as explained. When the die parts open, the ejection pins 16 and 18 will of course operate to eject the spoons from their cavities. These pins are shown offset in FIG. 2 merely for clarity of illustration.

The reference numeral 30 in FIG. 2 represents a space and when plate 20 retracts to the left, this space gradually closes. Ejector pin 16 therefore extends out through the face of the die part 20 to eject articles A, because pins 16 are bottomed on fixed plate 32.

However the ejection pins 18 do not operate at this time because the stops at 34 on the ejector pins 18 retract into the cavities 36 in the plate 32 until they bottom on the shoulders 38, whereupon of course the pins 18 cease to retract and come into play to eject the remaining articles B not ejected by pins 16.

When pins 16 eject the alternate spoons A, A, A they disrupt these articles from the remaining spoons B, B, B at points 14, so that all the articles are disrupted from each other and are all free of each other, articles A having been ejected already. Articles B, B are then ejected by pins 18, and no degating is necessary.

It will be noted that the outer pins, relative to the center of the mold, are on the arc of a circle whose center is in the opposite part of the mold, but the inner pins 16 are farther from the mold center than inner pins 18. This gives a slightly different ejection impact on articles B, and assists in a more positive disruption of the first ejected articles, completely separating them from the second ejected articles.

I claim:

1. In a die for molding articles, cavities arranged with communication between contiguous cavities forming means for the running of molten plastic material so that when cooled a variety of parts are connected together into a single shot, means for ejecting alternate articles from the die, thereby disrupting all the articles from each other and thereby degating them, and second ejection means for ejecting the remainder of the articles.

2. In a die for molding elongated articles, a pair of die parts having complementary cavities therein forming molding cavities for the articles, said cavities being arranged at inclinations respective to each other and touching at the closest ends thereof forming passages from one article to another for the passage of molten plastic material, and two sets of ejection pins, means for causing the operation of one set of pins while delaying the operation of the other set of pins, means for finally operating the second set of pins, the two sets of pins being in alternating relationship with respect to contiguous articles, so that alternating articles are ejected first and the remainder of the articles are ejected afterwards.

3. The die of claim 2 wherein there is a plurality of ejection pins for each article.

4. The die of claim 3 wherein certain of the ejection pins are located adjacent certain ends of the articles and in longitudinally spaced relation thereto.

5. The die of claim 4 wherein the ejection pins are closer together in alternate cavities.

6. The die of claim 5 wherein the articles are spoons and certain ejection pins are adjacent the bowls of the spoons.

7. The die of claim 6 wherein the remaining ejection pins are located adjacent the opposite ends of the spoons.

8. The die of claim 7 wherein certain of the said remaining ejection pins, in alternate cavities, are closer to the opposite spoon ends than others thereof.

* * * * *